US009043472B1

United States Patent
Chau

(10) Patent No.: US 9,043,472 B1
(45) Date of Patent: May 26, 2015

(54) METHOD AND SYSTEM FOR PROVIDING TRANSMISSION CONTROL PROTOCOL DEAD CONNECTION DETECTION

(75) Inventor: Hung Chau, Highland, CA (US)

(73) Assignee: Cisco Technology, Inc., San Jose, CA (US)

( * ) Notice: Subject to any disclaimer, the term of this patent is extended or adjusted under 35 U.S.C. 154(b) by 1747 days.

(21) Appl. No.: 11/423,426

(22) Filed: Jun. 9, 2006

(51) Int. Cl.
*G06F 15/173* (2006.01)
*H04L 12/26* (2006.01)

(52) U.S. Cl.
CPC ............ *H04L 43/10* (2013.01); *H04L 43/0811* (2013.01)

(58) Field of Classification Search
USPC .......................................... 709/224, 227–229
See application file for complete search history.

(56) References Cited

U.S. PATENT DOCUMENTS

| 6,070,187 | A  | * | 5/2000  | Subramaniam et al. ...... 709/220 |
| 6,779,039 | B1 | * | 8/2004  | Bommareddy et al. ...... 709/238 |
| 6,976,071 | B1 | * | 12/2005 | Donzis et al. ................. 709/224 |
| 2003/0084161 | A1 | * | 5/2003 | Watson et al. ................ 709/227 |
| 2004/0044771 | A1 | * | 3/2004 | Allred et al. .................. 709/227 |
| 2006/0020707 | A1 | * | 1/2006 | Undery et al. ................ 709/230 |

* cited by examiner

*Primary Examiner* — Thai Nguyen
(74) *Attorney, Agent, or Firm* — Novak Druce Connolly Bove + Quigg LLP

(57) ABSTRACT

Method and system for providing detection of dead or failed network communication session connections (such as TCP or UDP) in a data network by an intermediary node in the data network coupled to the end nodes (such as the client terminal and the server terminal) are provided.

20 Claims, 5 Drawing Sheets

US 9,043,472 B1

METHOD AND SYSTEM FOR PROVIDING TRANSMISSION CONTROL PROTOCOL DEAD CONNECTION DETECTION

FIELD OF THE INVENTION

The present invention relates to data network management. More specifically, the present invention relates to method and system for monitoring network connection and detecting connection failure.

BACKGROUND

In existing data network, sentry devices such as firewalls are deployed to enforce security policies of end-to-end sessions. To implement these policies, memory resource at the sentry device is necessary. Most of the memory resource is per-session and exists for the duration of the end-to-end sessions. To prevent the condition where quiet session terminations leading to stale states permanently holding the per-session memory, time out configurations are provided to release the per-session memory resource when a period of time has passed without session activity. In such configurations, there is no ability to automatically detect and expire a dead connection. In topologies where long live connections are necessary, typically infinite timeout is used. However, this approach requires manual maintenance to ensure that the number of dead connections does not subsume the end host device.

In view of the foregoing, it would be desirable to have methods and systems for simplified monitoring and detection of TCP session connections to automatically detect dead connections.

SUMMARY OF THE INVENTION

In view of the foregoing, in accordance with the various embodiments of the present invention, there is provided method and system for providing automatic detection of dead TCP connections in a data network by an intermediary node in the data network coupled to the end nodes (such as the client terminal and the server terminal). While the description of the various embodiments of the present invention is provided in the context of TCP session connection, within the scope of the present invention, other suitable protocols may be used such as, but not limited to, for example, User Datagram Protocol (UDP).

These and other features and advantages of the present invention will be understood upon consideration of the following detailed description of the invention and the accompanying drawings.

DETAILED DESCRIPTION

Figure 1:
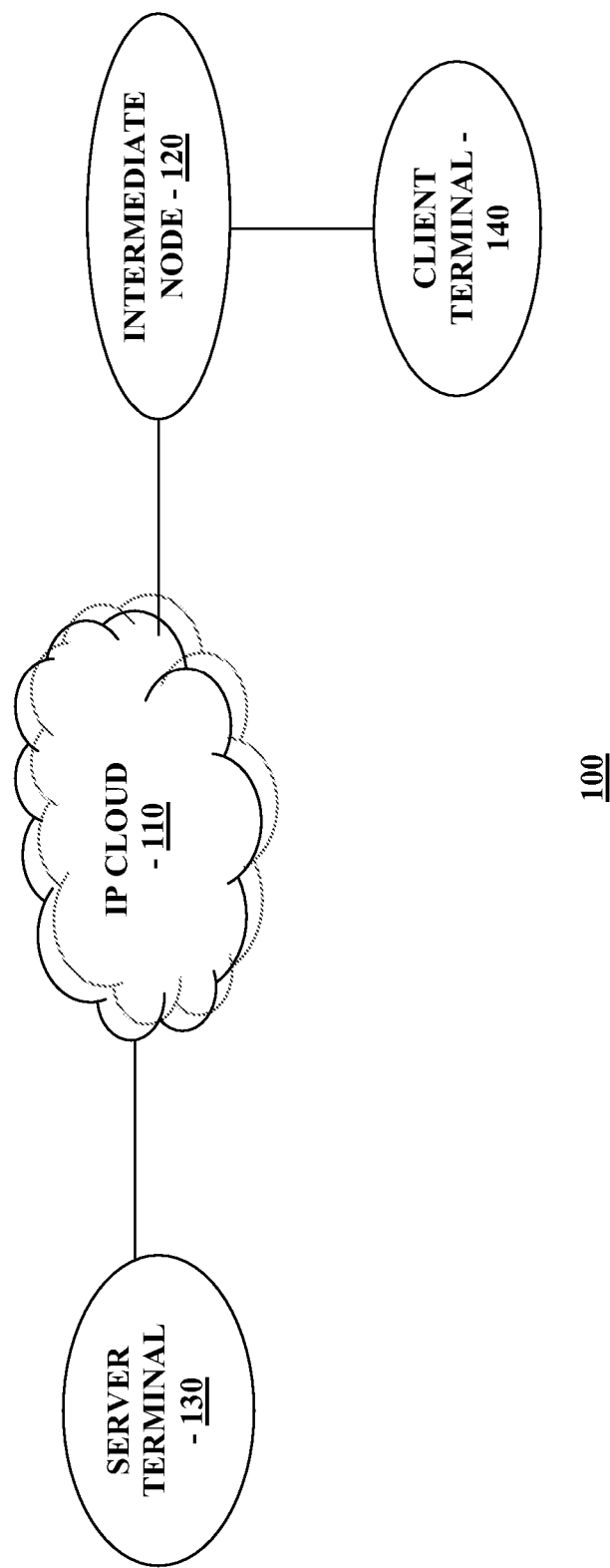
FIG. 1 is a block diagram of an overall data network for practicing one or more embodiments of the present invention.

FIG. 1 is a block diagram of an overall data network for practicing one or more embodiments of the present invention. Referring to FIG. 1, in one embodiment of the present invention, a data network 100 includes an IP cloud 110, a server terminal 130 operatively coupled to the IP cloud 110 or, for example, bi-directional communication, and an intermediate node 120 which is also operatively coupled to the IP cloud 110 for bi-directional communication. Referring to FIG. 1, there is also provided a client terminal 140 which is operatively coupled to the intermediate node 120.

While one intermediate node 120, one server terminal 130 and one client terminal 140 are shown in FIG. 1, within the scope of the present invention, a plurality of each of the intermediate node 120, server terminal 130 and client terminal 140 may be provided. In addition, in accordance with various embodiments of the present invention, the server terminal 130 may be operatively coupled to the client terminal 140 for data communication over the intermediate node 120. That is, in one aspect of the present invention, the intermediate node 120 is configured to reside between the server terminal 130 and the client terminal 140 so as to monitor, for example, data traffic between the server terminal 130 and the client terminal 140.

Referring back to FIG. 1, in one embodiment, the intermediate node 120 may include a network switch, a router device, or a firewall device, or any other similar type of device that may be configured for handling data packets between two end points (for example, between the server terminal 130 and the client terminal 140) of the data network 100. More specifically, the intermediate node 120 may be configured to maintain state information of the TCP session (or any other types of end-to-end communication protocol configured with a keep alive mechanism) between the server terminal 130 and the client terminal 140 in the data network 100.

As discussed in further detail below, in one embodiment of the present invention, the intermediate node 120 may be configured to periodically transmit keep alive probes to the two end points of the TCP session (for example, to the server terminal 130 and to the client terminal 140), and upon detection of responses from the respective corresponding end points of the TCP session indicating a valid connection session between the two end points, the intermediate node 120 refreshes an idle timer, declares the session as valid, and reschedules keep alive probes for the next interval. If no or incomplete response is received, the intermediate node 120 is configured to declare the session as invalid, terminates the session, and may reset the end points depending on the configuration.

In this manner, in one embodiment of the present invention, by maintaining the keep alive function with the intermediate node 120, it is not necessary to configure each end point in the data network 100 with the keep alive function to monitor the session state between the end points in the data network 100.

Figure 2:
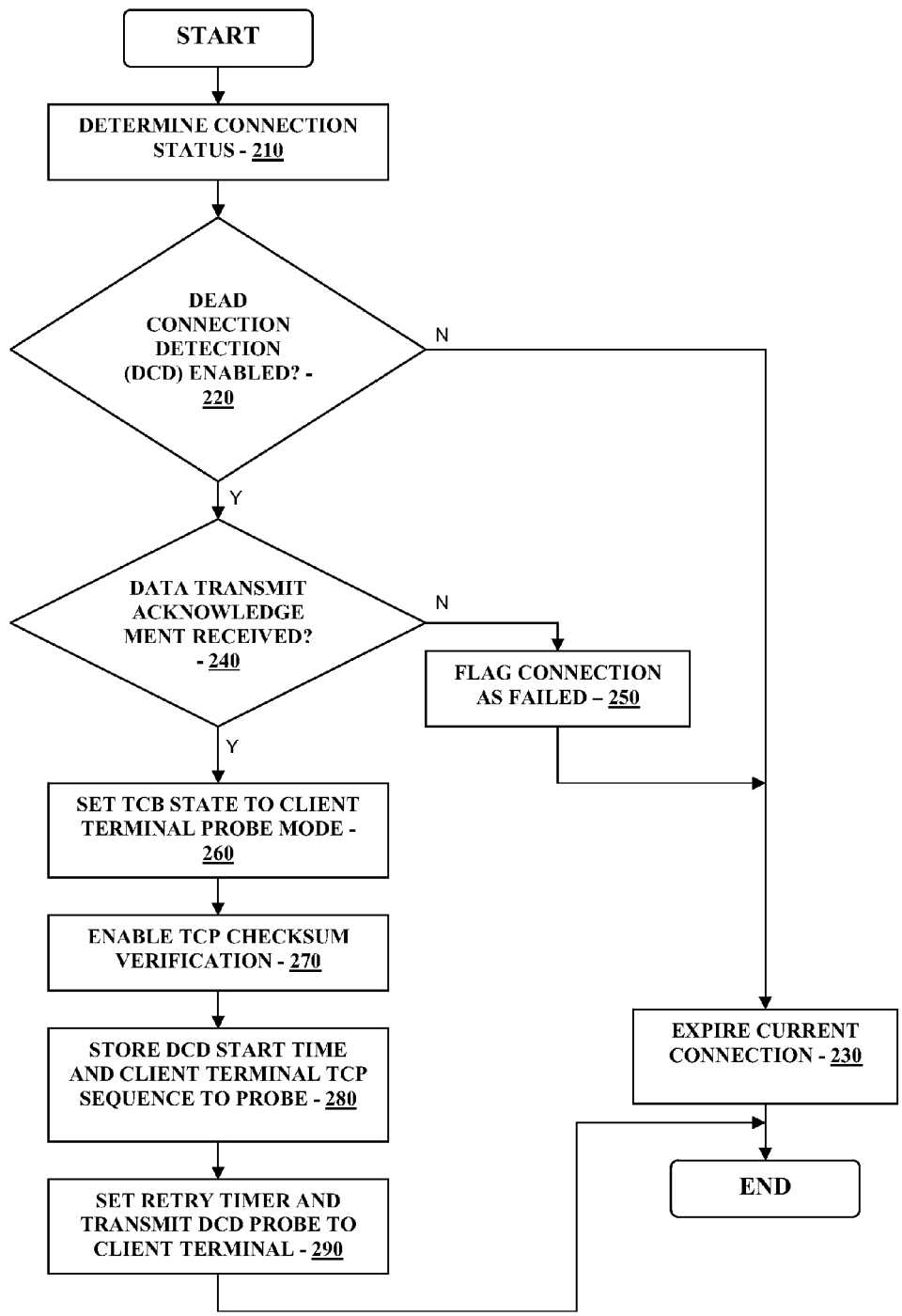
FIG. 2 is a flowchart illustrating the idle timeout procedure in accordance with one embodiment of the present invention.

FIG. 2 is a flowchart illustrating the idle timeout procedure in accordance with one embodiment of the present invention. Referring to FIG. 2 and in conjunction with FIG. 1, the intermediate node 120 (FIG. 1) at step 210 of FIG. 2 is configured to determine a session connection status of the server terminal 130 and the client terminal 140. Thereafter, at step 220 it is determined whether the dead connection detection (DCD) is enabled in the communication session such as, for example, an ftp connection over the TCP session, a telnet connection over the TCP session, or an http connection over the TCP session.

Referring back to FIG. 2, if it is determined at step 220 that the dead connection detection is not enabled, then at step 230, the session connection is expired and the routine terminates as there is no active TCP session. On the other hand, if it is determined at step 220 that the dead connection detection (DCD) is enabled in the session connection, then at step 240, it is determined whether data transmit acknowledgement is received from the server terminal 130 for all transmitted data, for example, from the client terminal 140. That is, at step 240, it is determined whether data transmitted from one end point in the TCP session (for example, the client terminal 140), has a returned data receipt acknowledgement corresponding thereto from the other end point in the TCP session (for example, the server terminal 130), for data transmission originating from both end points in the TCP session.

Referring again to FIG. 2, if at step 240 it is determined that any data transmit acknowledgement corresponding to the respective data transmission from the data transmission originating end point is not received, then at step 250, the session connection is flagged as failed indicating the connection as invalid, and the routine expires the session connection at step 230 as described above. On the other hand, if at step 240 it is determined that data transmit acknowledgement is received, then idle timeout configuration procedure continues as described below.

More specifically, when it is determined at step 240 that all data transmit acknowledgement in the session are received for data transmission originating from both end points of the TCP session, then at step 260, the TCB (TCP Control Block) state is configured to client terminal probe mode. Thereafter, at step 270, the TCP checksum verification is enabled, and at step 280, the enabled dead connection session (DCD) start time and the client terminal TCP sequence to probe are stored. Then, at step 290, the retry timer for the idle timeout sequence is set and the dead connection detection probed is transmitted to the client terminal 140 (FIG. 1).

Referring back to FIG. 2, while the above description is provided in the conjunction with the client terminal 140 of the data network 100 (FIG. 1), within the scope of the present invention, the idle timeout routine, which, in one embodiment, may be configured for performing a periodic timeout probing scheme (for example, each hour period, or any other suitable time period) as described in conjunction with FIG. 2 may be initiated with any end point or node in the data network 100 (FIG. 1).

Figure 3:
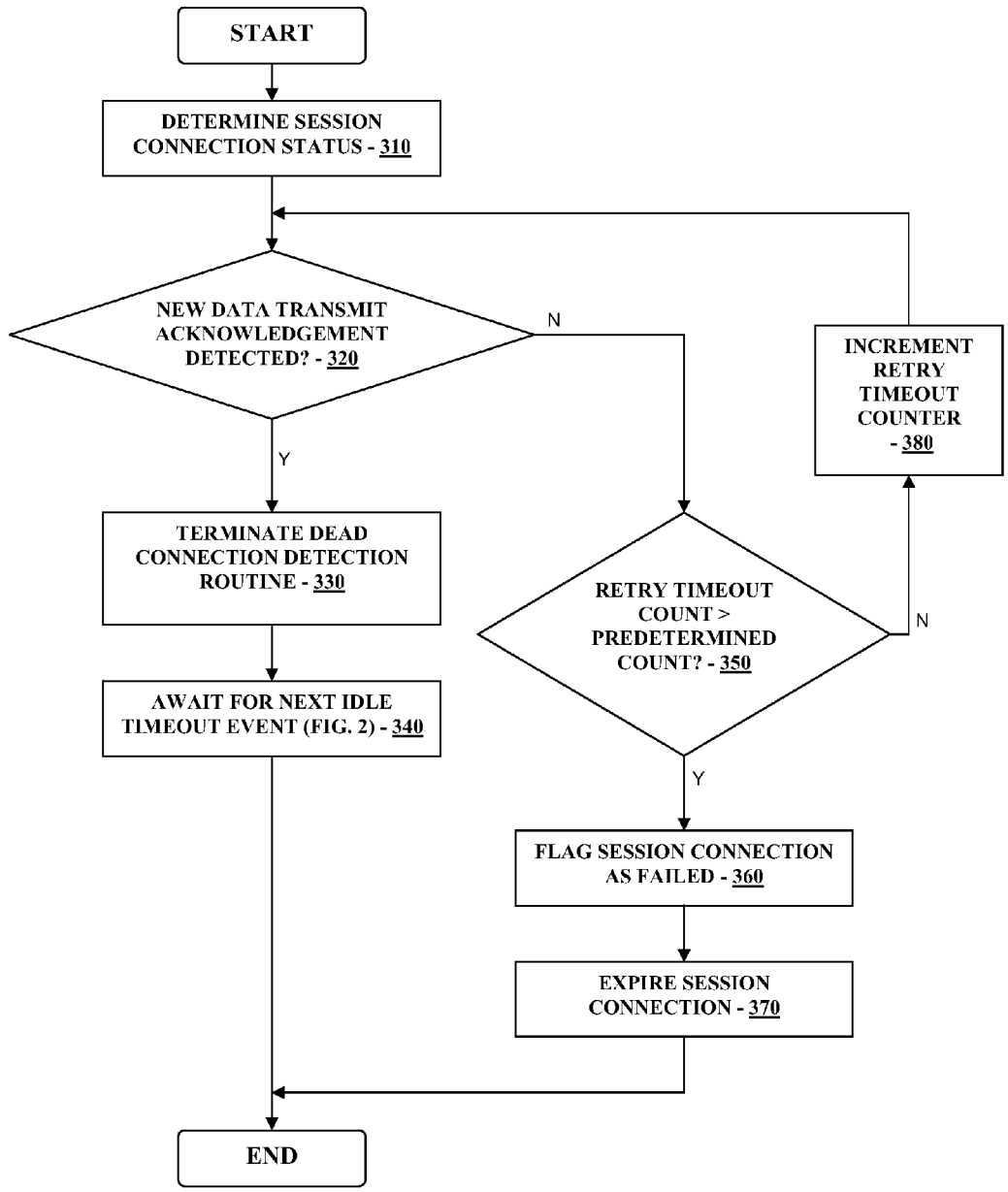
FIG. 3 is a flowchart illustrating the retry timeout procedure in accordance with one embodiment of the present invention.

FIG. 3 is a flowchart illustrating the retry timeout procedure in accordance with one embodiment of the present invention. Referring to FIG. 3, at step 310 the session connection status is determined. Thereafter at step 320, it is determined whether data transmit acknowledgement is received for any new data originating from one of the end points of the TCP session (for example, the client terminal 140). Referring back, similar to step 240 in FIG. 2, the intermediate node 120 (FIG. 1) in one embodiment may be configured to determine whether receipt of data transmitted from one end host (for example, the client terminal 140) is acknowledged by the other end host (for example, the server terminal 130) in the TCP session. Referring to step 320, in one embodiment, the intermediate node 120 (FIG. 1) is configured to compare the client terminal TCP sequence number stored at step 280 (FIG. 2) with the updated TCP sequence number received from the client terminal 140 with the new data transmission from the client terminal 140.

Referring back to FIG. 3, if at step 320 it is determined that data transmit acknowledgement is not detected which corresponds to the new data originating from one of the end points of the TCP session (for example, the client terminal 140), then at step 350, the retry timeout count is compared with a predetermined retry timeout count which may be preconfigured by the user or the administrator (for example, as 5, or 7, or any other suitable timeout count). If at step 350 it is determined that the retry timeout count does not exceed the predetermined count, then at step 380, the retry timeout counter is incremented by one, and the routine returns to step 320. On the other hand, if at step 350, it is determined that the retry timeout count exceeds the predetermine count 350, then at step 360, the TCP session is identified or flagged as failed indicating a dead session connection. Thereafter, the session connection is expired at step 370 and the routine terminates.

Referring yet again to FIG. 3, if at step 320 it is determined that the data transmit acknowledgement is detected which corresponds to the new data originating from one of the end points of the TCP session (for example, the client terminal 140), then at step 330, the dead connection detection routine is terminated, since it can be determined that the TCP session is alive and active. That is, based on the detected data transmit acknowledgement from the server terminal 130, for example, which is responsive to the transmitted data from the client terminal 140, the intermediate node 120 determines that the TCP session between the server terminal 130 and the client terminal 140 is active.

After terminating the dead connection detection routine at step 330, in one embodiment, the intermediate node 120 (FIG. 1) at step 340 awaits for the next idle timeout event as described in conjunction with FIG. 2 above, and upon detection, executes the idle timeout routine as described above. In addition, the routine described above in conjunction with FIG. 3 corresponding to the retry timeout procedure may be performed for data transmission originating from the other end point in the TCP session (for example, the server terminal 130), in which case, the data transmit acknowledgement for the corresponding transmitted data is received by the intermediate node 120 from the first endpoint in the TCP session (for example, the client terminal 140).

Figure 4:
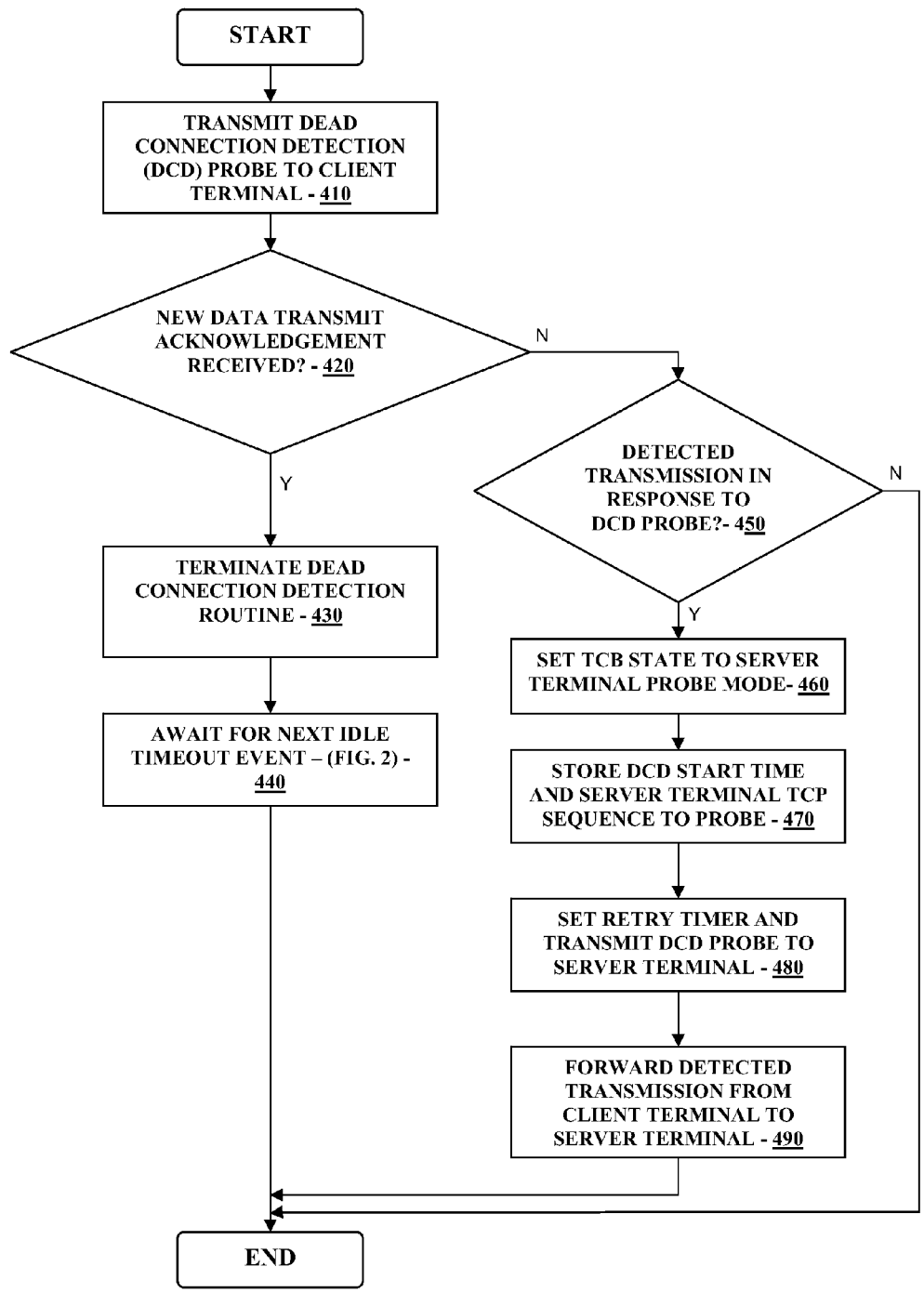
FIG. 4 is a flowchart illustrating the dead connection detection procedure when data packet is received from the client terminal in the TCP session in accordance with one embodiment of the present invention.

FIG. 4 is a flowchart illustrating the dead connection detection procedure when data packet is received from the client terminal in the TCP session in accordance with one embodiment of the present invention. Referring to FIG. 4, in one embodiment, at step 410, the intermediate node 120 (FIG. 1) is configured to transmit a dead connection detection (DCD) probe to the client terminal 140 (FIG. 1) after receiving one or more data packets from the client terminal 140. Thereafter, at step 420, it is determined whether new data transmit acknowledgement is received.

That is, similar to step 320 (FIG. 3), it is determined at step 420 whether the other end point (for example, the server terminal 130) of the session coupled to the client terminal 140 has acknowledged the receipt of the new data transmit from the client terminal 140. In one embodiment, the intermediate node 120 (FIG. 1) is configured to compare the client terminal TCP sequence number stored at step 280 (FIG. 2) with the updated TCP sequence number received from the client terminal 140 with the new data transmission from the client terminal 140.

If it is determined at step 420 that new data transmit acknowledgement is received at step 420, then at step 430, it is determined that the session connection is valid, and at step 430, the dead connection detection routine terminates. Thereafter, similar to step 340 of FIG. 3, at step 440 the intermediate node 120 (FIG. 1) waits for the next scheduled idle timeout event to trigger the execution of the idle timeout procedure as described above in conjunction with FIG. 2.

Referring back to FIG. 4, if at step 420 it is determined that the new data transmit acknowledgement is not received, then at step 450, it is determined whether the data packet received from the client terminal 140 is responsive to the keep alive probe transmitted to the client terminal 140. That is, the intermediate node 120 determines at step 450 whether the detected transmission from the client terminal 140 is in response to the dead connection detection (DCD) probe.

If at step 450 it is determined that the received data packet from the client terminal 140 is responsive to the dead connection detection probe, then at step 460, the TCB (TCP Control Block) state is configured to server terminal probe mode. Thereafter, at step 470, the enabled dead connection session (DCD) start time and the server terminal TCP sequence to probe are stored. Then, at step 480, the retry timer for the idle timeout sequence is set and the dead connection detection probed is transmitted to the server terminal 140 (FIG. 1). Thereafter at step 490, the keep alive reply data packet (for example, the data packet received from the client terminal 140 in response to the dead connection detection probe) is forwarded to the other end node of the TCP session (for example, the server terminal 130 (FIG. 1).

Referring back to FIG. 4, if at step 450 it is determined that the detected data packet from the client terminal 140 is not in response to the dead connection detection (DCD) probe, then the detected data packet is ignored or dropped based on the predetermined security policy configuration of the intermediate node 120 (FIG. 1).

Figure 5:
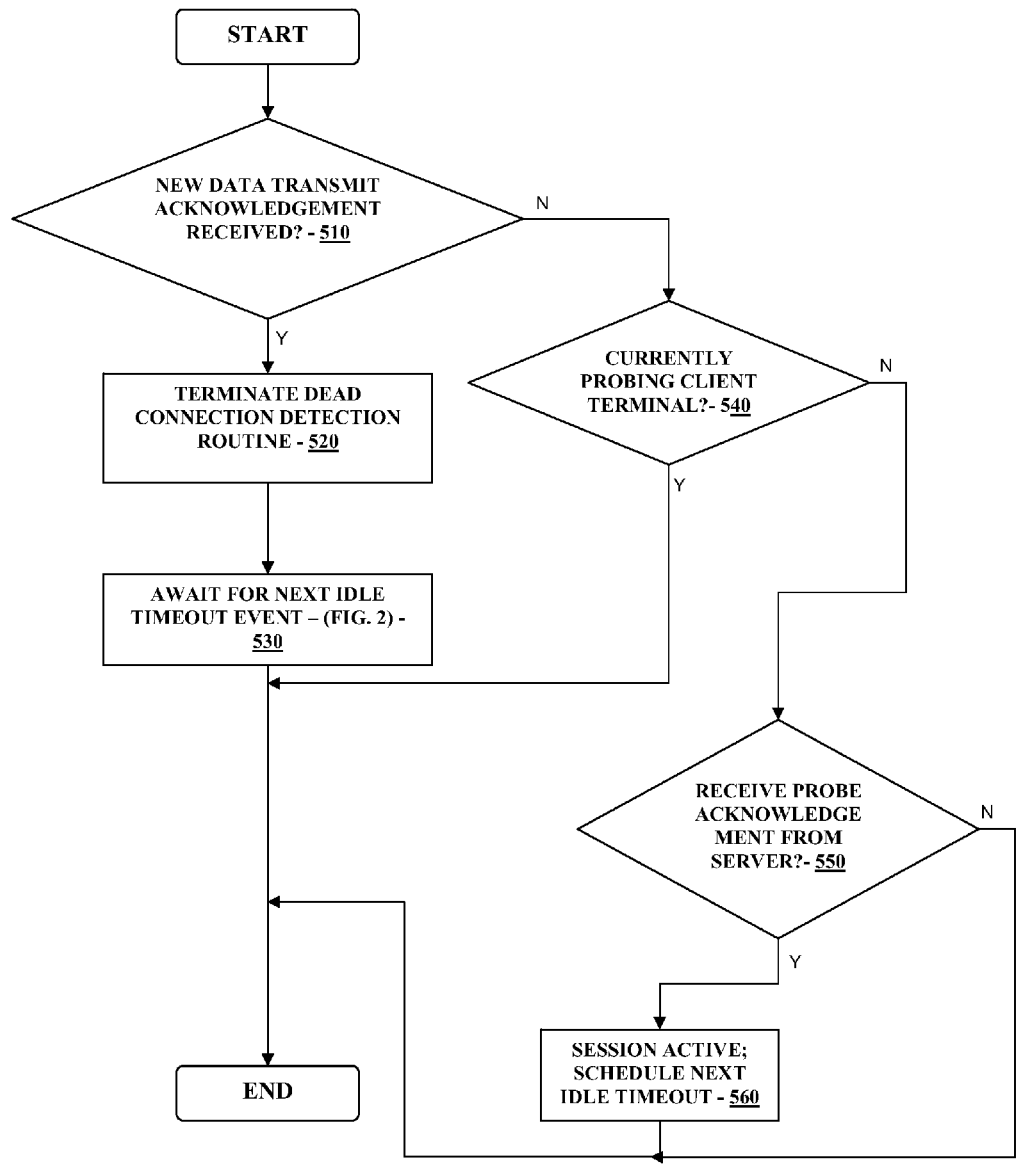
FIG. 5 is a flowchart illustrating the dead connection detection procedure when data packet is received from the server terminal in the TCP session in accordance with one embodiment of the present invention.

FIG. 5 is a flowchart illustrating the dead connection detection procedure when data packet is received from the server terminal in the TCP session in accordance with one embodiment of the present invention.

Referring to FIG. 5, at step 510, it is determined whether new data transmit acknowledgement is received. That is, similar to step 420 (FIG. 4), it is determined at step 510 whether the other end node (for example, the client terminal 140) of the session coupled to the server terminal 130 has acknowledged the receipt of the new data transmit from the server terminal 130. That is, in one embodiment, the intermediate node 120 is configured to compare the server terminal TCP sequence number (for example, stored at step 470 (FIG. 4) with the sequence number associated with the new data transmit from the server terminal 130 to the client terminal 140.

If it is determined at step 510 that new data transmit acknowledgement is received at step 510, then it is determined that the session connection is valid active, and at step 520, the dead connection detection routine terminates. Thereafter, at step 530 the intermediate node 120 (FIG. 1) waits for the next scheduled idle timeout event to trigger the execution of the idle timeout procedure as described above in conjunction with FIG. 2.

Referring back to FIG. 5, at step 510, if it is determined that the data transmit acknowledgement is not received, then at step 540, it is determined whether intermediate node 120 is currently probing the client terminal 140 with a dead connection detection probe (for example, as discussed above in conjunction with FIG. 4). If it is determined at step 550 that the intermediate node 120 is currently probing the client terminal 120, then at step 560, the data packet received from the server terminal 130 is forwarded to the client terminal 140, for example, and the routine terminates.

On the other hand, if at step 540 it is determined that the client terminal 140 is not currently being probed, then at step 550 it is determined whether the data packet received from the server terminal 130 is in response to the dead connection detection probe transmitted from the intermediate node 120. That is, the data packet acknowledged probed sequence number is compared with the transmitted dead connection detection probe at step 550, and if it is determined that the data packet received from the server terminal 130 is in response to the dead connection detection probe, then at step 560 it is determined that the TCP session is valid, and the intermediate node 120 is configured to schedule or await for the subsequent idle timeout sequence.

Referring back to FIG. 5, if at step 570 it is determined that the data packet received from the server terminal 130 (FIG. 1) is not responsive to the dead connection detection probe, then the routine terminal and the data packet may be configured to be forwarded to the client terminal 140 as in accordance with a predetermined security policy configurations of the intermediate node 120.

In the manner described above, in accordance with the various embodiments of the present invention, there is provided an intermediate node in the data network which may be configured to inject a keep-alive probe to each of the end-points of the TCP session to detect the end-host session status before idle timeout expiration. Accordingly, in one aspect of the present invention, software support or any other maintenance support for all of the end-hosts in the network can be replaced by configuring a single (or a limited number of) intermediate node in the network to maintain the state information of the connection sessions and to detect dead connections based on keep alive probe procedures as described above.

A method of automatically detecting data communication connection failure in one embodiment of the present invention includes transmitting, during a data communication session between a first end node and a second end node, a first probe signal from an intermediate node of the data network to a first end node, the intermediate node operatively coupling the first end node to the second end node, receiving a first data from the first end node by the intermediate node, and updating the data communication session status based on the detected first data.

In one aspect, when the detected first data is not associated with the first probe signal, the updating step may include the step of expiring the data communication session.

Further, in one aspect, when the received first data includes an acknowledgement associated with the first signal, the method may further include the step of updating an idle timeout session associated with the data communication session.

Also, updating the idle timeout session may also include initializing a retry timer, and transmitting a second probe signal to the second end node of the data communication session.

The method may also include receiving a second data from the second end node by the intermediate node, and updating the data communication session status based on the second data, where when the received second data is not associated with the second probe signal, the method further including the step of incrementing the retry timer.

In addition, the method may also include the step of expiring the data communication session.

Also, when the detected second data is associated with the second probe signal, the method may further include the step of maintaining the data communication session.

In a further aspect, the data communication session may include one or more of a TCP session or a UDP session.

A method of automatically detecting data communication connection failure in accordance with yet another embodiment of the present invention includes transmitting, during a data communication session between a first end node and a second end node, a first keep alive signal from an intermediate node of the data network to a first end node, the intermediate node operatively coupling the first end node to the second end node, determining the status of the first end node in the data communication session based on the first keep alive signal, transmitting, during the data communication session a second keep alive signal from the intermediate node to a second end node, determining the status of the second end node in the data communication session based on the second keep alive signal, and updating the data communication session status based on one or of the status of the first end node or the second end node.

In one aspect, the updating step may include expiring the data communication session when the status of the one or more of the first end node or the second end node indicates a failed connection in the data communication session.

Also, the method may further include the step of executing an idle timeout event.

A system for providing automatic detection of a data communication session failure in accordance with still another embodiment of the present invention includes an interface device operatively coupled to a data network configured to maintain a data communication session, the interface device configured to transmit a first probe signal to a first end node of the data communication session, detect a first data from the first end node, and update the data communication session status based on the first data.

In one aspect, when the detected first data is not associated with the first probe signal, the interface device may be further configured to expire the data communication session.

In an additional aspect, when the detected first data includes an acknowledgement associated with the first signal, the interface device may be further configured to update an idle timeout session associated with the data communication session.

In still another aspect, the interface device may be further configured to initialize a retry timer, and transmit a second probe signal to a second end of the data communication session.

Also, the interface device in yet another embodiment may be configured to detect a second data from the second end node, and update the data communication session status based on the second data.

Further, when the detected second data is not associated with the second probe signal, the interface device may be further configured to increment the retry timer. On the other hand, when the detected second data is associated with the second probe signal, the interface device may be further configured to maintain the data communication session.

The interface device in one aspect may include one or more of a firewall, a router, or a switch.

A system for providing automatic detection of a data communication connection failure in accordance with yet still another embodiment of the present invention includes means for transmitting a first probe signal to a first end node of a data communication session, means for detecting a first data from the first end node, means for transmitting a second probe signal to a second end of the data communication session, means for detecting a second data from the second end node, and means for updating the data communication session status based on the one or more of the first data or the second data.

The various processes described above including the processes performed by the intermediate node 120 in the software application execution environment in the data network 100 including the processes and routines described in conjunction with FIGS. 2-5, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the intermediate node 120, may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method comprising:
generating, at an intermediate node, a first keep-alive probe signal designated for a first end terminal in an end-to-end communication path and a second keep-alive probe signal designated for a second end terminal in the end-to-end communication path, the intermediate node residing at a point in the end-to-end communication path between the first end terminal and the second end terminal;
during a communication session between the first end terminal and the second end terminal, transmitting, from the intermediate node, the first keep-alive probe signal to the first end terminal and the second keep-alive probe signal to the second end terminal;
determining that a complete response to the first keep-alive probe signal and the second keep-alive probe signal has not been received by the intermediate node from the first end terminal and the second end terminal within a predetermined period of time after the first keep-alive probe signal and the second keep-alive probe signal were transmitted to the first end terminal and the second end terminal, wherein determining that the complete response has not been received comprises comparing a first TCP sequence number associated with one of the first end terminal or the second end terminal with a second TCP sequence number associated with new data transmitted from one of the first end terminal or the second end terminal; and
in response to a determination that the complete response has not been received by the intermediate node updating a status of the communication session to indicate an invalid state of the communication session.

2. The method of claim 1, further comprising: based on the invalid state of the communication session, terminating the communication session.

3. The method of claim 1, further comprising:
determining that a retry timeout count exceeds a predetermined retry timeout count; and
after determining that the complete response has not been received, generating an indication of the invalid state of the communication session based on a determination that the retry timeout count exceeds the predetermined retry timeout count.

4. The method of claim 3, wherein the complete response comprises a first acknowledgement from the first end terminal and a second acknowledgement from the second end terminal, and wherein the communication session is configured according to a long-live timeout, the method further comprising:
  resetting a configuration associated with the first end terminal and the second end terminal.

5. The method of claim 1, further comprising: when the received second data is not associated with the second probe signal from the intermediate node, incrementing the retry timer;
  determining that a retry timeout count is less than a predetermined retry timeout count;
  transmitting, via the intermediate node, a third keep-alive probe signal to at least one of the first end terminal or the second end terminal;
  detecting a failed response to the third keep-alive probe signal;
  incrementing the retry timeout count based on the failed response to yield an incremented retry timeout count;
  determining that the incremented retry timeout count is exceeds the predetermined retry timeout count; and
  generating an indication of the invalid state of the communication session based on a determination that the incremented retry timeout count exceeds the predetermined retry timeout count.

6. The method of claim 1, further comprising:
  detecting a data packet transmitted from at least one of the first end terminal and the second end terminal;
  determining that the data packet is not responsive to at least one of the first keep-alive probe signal or the second keep-alive signal; and
  based on a predetermined policy, dropping the data packet via the intermediate node.

7. The method of claim 1, wherein the communication session is configured according to an infinite timeout parameter, and wherein the intermediate node is configured to automatically detect a connection failure and expire the communication session in response to the connection failure.

8. The method of claim 1, wherein the communication session includes one or more of a TCP session or a UDP session, wherein the intermediate node is configured to monitor packets transmitted along the end-to-end communication path, and wherein the intermediate probe is configured to transmit a plurality of keep-alive probes to the first end terminal and the second end terminal at predetermined time intervals.

9. A method comprising:
  generating, at an intermediate node, a first keep alive signal designated for a first end terminal in an end-to-end communication path and a second keep-alive probe signal designated for a second end terminal in the end-to-end communication path, the intermediate node residing at a point in the end-to-end communication path between the first end terminal and the second end terminal;
  during a communication session between the first end terminal and the second end terminal, transmitting, from the intermediate node, the first keep alive signal to the first end terminal and the second keep alive signal to the second end terminal;
  receiving, via the intermediate node, a response to the first keep alive signal and the second keep alive signal within a predetermined period of time after the first keep alive signal and the second keep alive signal were transmitted to the first end terminal and the second end terminal;
  determining that the response is a complete response by comparing a first TCP sequence number associated with one of the first end terminal or the second end terminal with a second TCP sequence number associated with new data transmitted from the one of the first end terminal or the second end terminal; and
  in response to receiving the response and determining that the response is a complete response, updating a communication session connection status associated with the communication session to indicate that the communication session is valid.

10. The method of claim 9, wherein the response comprises an acknowledgment from at least one of the first end terminal or the second end terminal, and wherein the updating step includes modifying a timeout counter.

11. The method of claim 9, wherein the communication session includes one or more of a TCP session or a UDP session, and wherein the communication session is configured according to an infinite timeout parameter, the intermediate node being configured to automatically detect a connection failure and expire the communication session in response to the connection failure.

12. The method of claim 9, further comprising:
  determining that a retry timeout count is less than a predetermined retry timeout count;
  transmitting, via the intermediate node, a third keep alive signal to at least one of the first end terminal or the second end terminal;
  detecting a failed response to the third keep alive signal;
  incrementing the retry timeout count based on the failed response to yield an incremented retry timeout count;
  determining that the incremented retry timeout count is exceeds the predetermined retry timeout count; and
  generating an indication of an invalid state of the communication session based on the failed response and a determination that the incremented retry timeout count exceeds the predetermined retry timeout count.

13. A system comprising:
  a processor; and
  a computer-readable storage medium having stored therein instructions which, when executed by the processor, cause the processor to perform operations comprising:
    sending, via the system, a first keep-alive probe signal to a first end terminal in an end-to-end communication path and a second keep-alive probe signal to a second end terminal in the end-to-end communication path, the system comprising an intermediate node residing at a point in the end-to-end communication path between the first end terminal and the second end terminal;
    determining that a complete response to the first keep-alive probe signal and the second keep-alive probe signal has not been received by the system from the first end terminal and the second end terminal within a predetermined period of time after the first keep-alive probe signal and the second keep-alive probe signal were transmitted to the first end terminal and the second end terminal, wherein determining that the complete response has not been received comprises comparing a first TCP sequence number associated with one of the first end terminal or the second end terminal with a second TCP sequence number associated with new data transmitted from the one of the first end terminal or the second end terminal; and
    in response to a determination that the complete response has not been received by the system, updating a status of the communication session to indicate an invalid state of the communication session.

14. The system of claim 13, the computer-readable storage medium having stored therein instructions which, when executed by the processor, result in an operation further comprising: based on the invalid state of the communication session, terminating the communication session.

15. The system of claim 13, wherein the communication session is configured according to an infinite timeout parameter, and wherein the system is configured to automatically detect a connection failure and expire the communication session in response to the connection failure.

16. The system of claim 15, the computer-readable storage medium having stored therein instructions which, when executed by the processor, result in an operation further comprising:
initializing a retry timer.

17. The system of claim 16, the computer-readable storage medium having stored therein instructions which, when executed by the processor, result in an operation further comprising incrementing the retry timer.

18. The system of claim 13, wherein the system is configured to monitor packets transmitted along the end-to-end communication path, and wherein the system is configured to transmit a plurality of keep-alive probes to the first end terminal and the second end terminal at predetermined time intervals.

19. The system of claim 13 wherein the data communication session includes one or more of a TCP session or a UDP session, wherein the communication session is configured according to an infinite timeout parameter, and wherein the system is configured to automatically detect a connection failure and expire the communication session in response to the connection failure.

20. A non-transitory computer-readable storage medium having stored therein instructions which, when executed by a processor, cause the processor to perform operations comprising:
generating, at an intermediate node, a first keep-alive probe signal designated for a first end terminal in an end-to-end communication path and a second keep-alive probe signal designated for a second end terminal in the end-to-end communication path, the intermediate node residing at a point in the end-to-end communication path between the first end terminal and the second end terminal;
during a communication session between the first end terminal and the second end terminal, transmitting, from the intermediate node, the first keep-alive probe signal to the first end terminal and the second keep-alive probe signal to the second end terminal;
determining that a complete response to the first keep-alive probe signal and the second keep-alive probe signal has not been received by the intermediate node from the first end terminal and the second end terminal within a predetermined period of time after the first keep-alive probe signal and the second keep-alive probe signal were transmitted to the first end terminal and the second end terminal; and
in response to a determination that the complete response has not been received by the intermediate node updating a status of the communication session to indicate an invalid state of the communication session.

\* \* \* \* \*